Sept. 4, 1956
M. F. ECKER
2,761,712
HIGH-PRESSURE SEAL FOR ROTATING SHAFT
Filed May 15, 1952
2 Sheets-Sheet 1
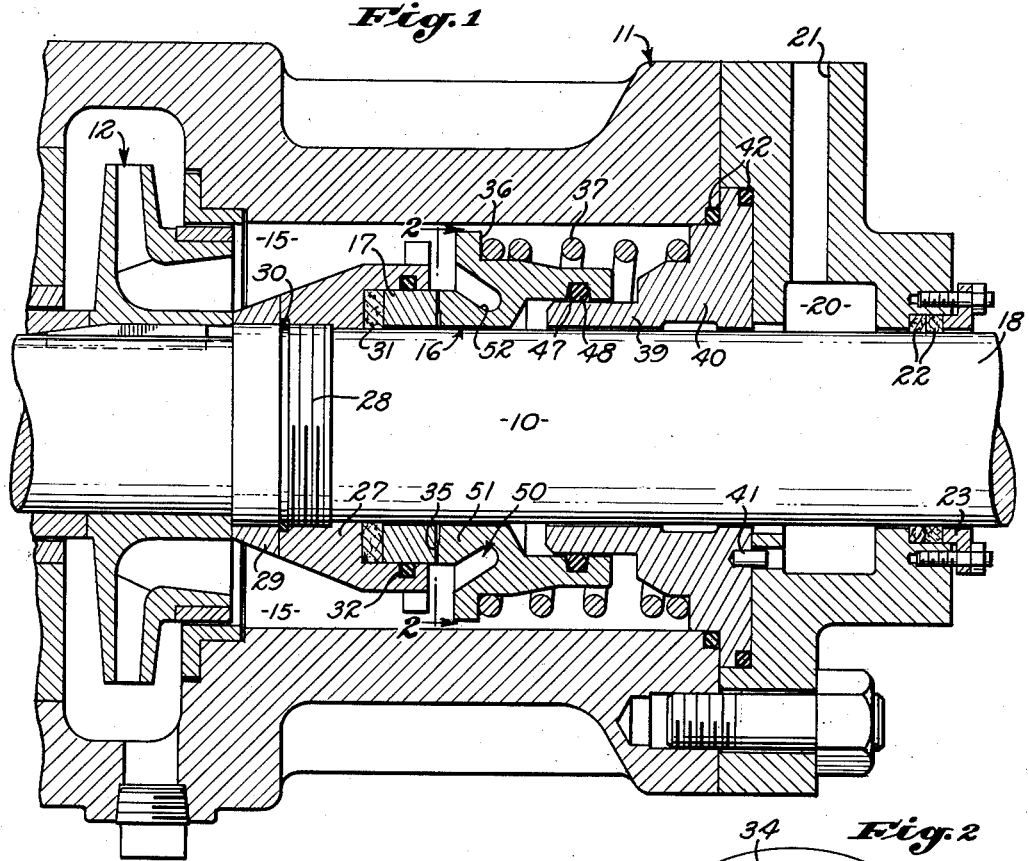
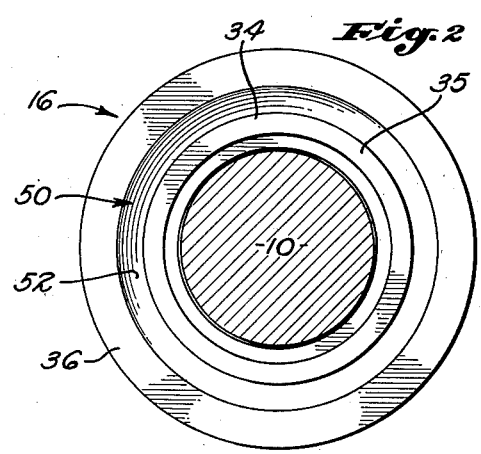
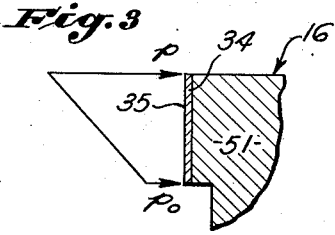
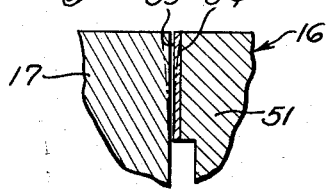
INVENTOR:
MURRY F. ECKER
BY HIS ATTORNEYS
HARRIS, KIECH, FOSTER & HARRIS Sept. 4, 1956            M. F. ECKER            2,761,712
HIGH-PRESSURE SEAL FOR ROTATING SHAFT
Filed May 15, 1952            2 Sheets-Sheet 2
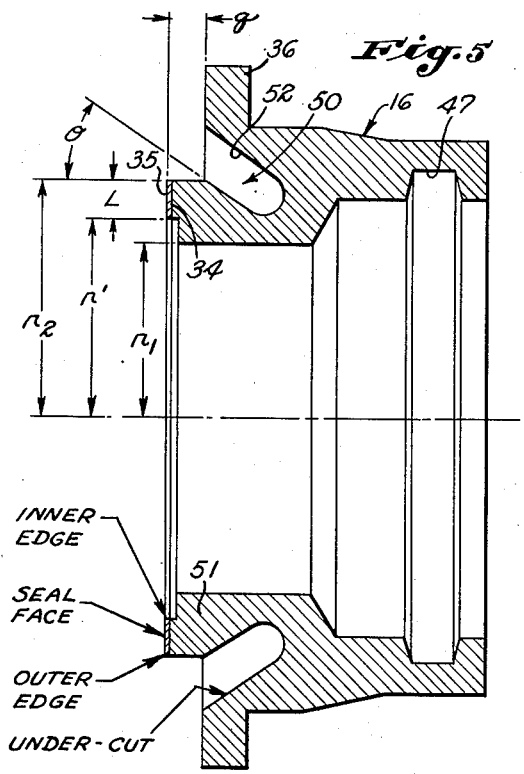
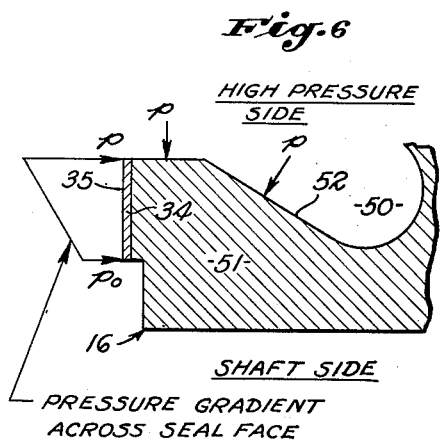
PRESSURE GRADIENT ACROSS SEAL FACE
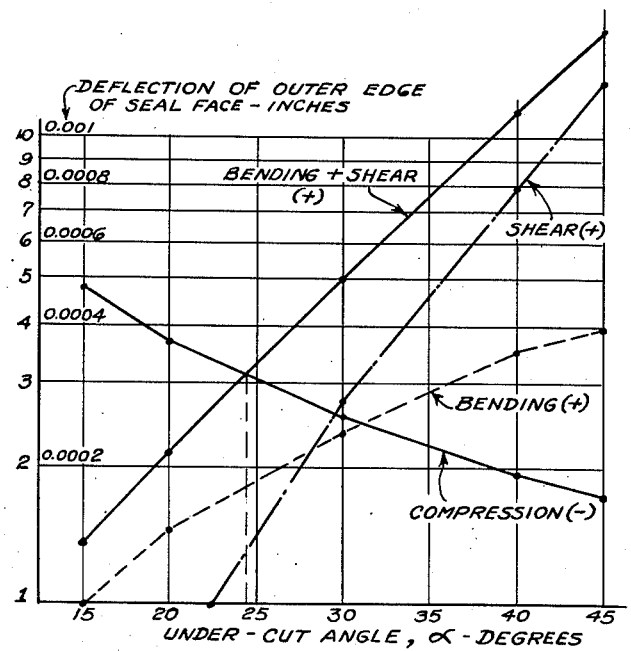
INVENTOR:
MURRY F. ECKER
BY HIS ATTORNEYS
HARRIS, KIECH, FOSTER & HARRIS

United States Patent Office 2,761,712
Patented Sept. 4, 1956

2,761,712

HIGH-PRESSURE SEAL FOR ROTATING SHAFT

Murry F. Ecker, Downey, Calif., assignor to Pacific Pumps, Inc., Huntington Park, Calif., a corporation of California Application May 15, 1952, Serial No. 287,893

4 Claims. (Cl. 286—11.14)

This invention relates to means for sealing a fluid under high pressure around a rotating member, such as a shaft, and is directed both to such a sealing means and to a method of arriving at an effective design for the sealing means.

A seal of this character comprises a sealing member in the form of a sleeve that rotates with the shaft and cooperates with a matching stationary annular sealing member to form an intervening seal gap of sufficiently small dimension to hold fluid leakage between the two members to an acceptable minimum rate. One of these two sealing members is floatingly mounted to be urged toward the other by fluid pressure and usually by additional spring pressure.

The principles of the present invention are applicable either to the floating sealing member or to the nonfloating sealing member. For the purpose of disclosure and to illustrate the principles involved, however, the invention will be described herein as applied solely to the floating sealing member which, in the selected embodiment of the invention, is a nonrotatable sleeve. The invention may be used to control radially outward pressure but will be described as used to control radially inward pressure.

The basic problem is to maintain a gap configuration and a gap dimension under conditions of high fluid pressure that will adequately control and minimize radially inward leakage flow between the two sealing members.

According to one theory, a definite but exceedingly small fluid-filled gap exists between the two sealing members under conditions of satisfactory sealing operation against a high pressure fluid, there being an equilibrium between the fluid pressure in the gap against the floating sealing member and the opposing pressure on the floating member. The opposing pressure is the sum of the opposing fluid pressure and the spring pressure. It is fundamental that there must be leakage flow to some degree across the seal gap between the two sealing members under the desired conditions to provide the necessary pressure gradient that accounts for one of the two opposed forces in equilibrium. The equilibrium equation is $$A_g p_e = A_p p + p_s$$

were $A_g$=area of the seal face at the gap; $p_e$=the effective unit pressure resulting from the pressure gradient across the gap; $A_p$=the effective area of the opposite end of the floating member on which the high pressure acts, i. e., the area of fluid pressure unbalance; $p$=the unit pressure of the confined fluid; and $p_s$=the unit pressure on the seal face due to spring load.

It is apparent that the desired equilibrium condition is made possible by the fact that with sufficiently accurately aligned seal faces, the tendency of the force $(A_p p + p_s)$ to close the seal gap is opposed by a sharp rise in the magnitude of $p_e$ as the seal gap narrows. The present invention is based on the discovery that the failure of seals of this character to function properly under especially high fluid pressures is attributable to distortion of the seal gap or misalignment of the seal faces caused by response to the high pressure on the part of the material of the sealing members. The success of the invention lies in the further discovery that one or both of the sealing members can be designed to bring into effect a contrary response to the high pressure on the part of the material that will largely, if not entirely, nullify the troublesome response. In accord with these discoveries, it is an object of the invention, therefore, to maintain the desired alignment of the seal faces at the seal gap under the application of high pressure by providing for balanced material responses to the high pressure, thereby cancelling out the pressure effects.

Broadly described, the invention attains its object by so shaping at least one of the two sealing members that yield of the member to the high pressure in one respect tending to distort the seal gap in one manner is offset by yield of the member in another respect tending to distort the seal gap in an opposite manner. More specifically described, the invention contemplates so shaping the sealing member that the response in compression of the sealing member tending to distort the seal gap to a fatal extent is compensated for by response of the material in shear and bend tending to restore the required gap configuration.

The object of the invention is to provide a sealing member having the desired self-correcting responsiveness to fluid pressure.

In general, this object is attained by so shaping the sealing member with respect to its longitudinal configuration as to provide an annular section adjacent the seal face that will act in shear and bend, in effect, to incline the seal face of the member oppositely to the inclination produced by compression of the material. Inclination in this context refers to the seal face as seen in section. Thus, non-uniform contraction of the material under pressure tends to incline the seal face of the member in one respect but the annular section includes the seal face and shifts in shear and bend to incline the seal face in opposite manner.

For the purpose of disclosure and to illustrate the principles involved, the present description will be directed to an annular sealing member in which the required annular section is formed by an undercut from the outer circumferential surface of the member, but it will be understood that the undercut may be made from the inner circumferential surface. The effect of undercutting from the inner circumferential surface is explained in my co-pending application Serial No. 287,894 entitled "Self-Correcting High Pressure Seal for Rotating Shaft," which disclosure is hereby made a part of the present disclosure by reference.

The various objects, features and advantages of the invention will be understood from the following detailed description considered with the accompanying drawings.

In the drawings, which are to be regarded as merely illustrative:

Fig. 1 is a longitudinal sectional view of a high pressure seal that includes a sealing member designed in accord with my invention;

Fig. 2 is a transverse section taken on the line 2—2 of Fig 1;

Fig. 3 is an enlarged diagrammatic view indicating in a general manner the pressure gradient that exists across a seal face;

Fig. 4 is a similar diagrammatic view showing how yield of the material in compression tends to distort the seal gap between two sealing members;

Fig. 5 is an enlarged sectional view of the sealing member showing dimensions to be taken into consideration in analytical calculations;

Fig. 6 is an enlarged fragment of Fig. 5 showing the pressure components involved in the yield of the material of the sealing member; and Fig. 7 is a graph that summarize the analytical calculations for arriving at a self-compensating configuration for the sealing member.

Figs. 1 and 2 show, by way of example, how the invention may be embodied in a seal for a shaft 10 that actuates impeller means in a boiler circulating pump, which pump is not shown in the drawing. An extension of the pump casing, designated by numeral 11, encloses an auxiliary circulating means 12 for the fluid under pressure and forms an annular space 15 around the shaft 10 in which the confined fluid is under exceedingly high pressure. In this instance, the contemplated pressure is approximately 2700 p. s. i.

A pair of annular sealing members 16 and 17 have suitable opposed faces forming a radial seal gap and cooperate to seal off the high pressure annular space 15 from the outer end portion 18 of the shaft 10. Radially inward leakage which is controlled at an acceptably low rate moves along the shaft 10 to an annular drainage space 20 from which it is discharged through a passage 21 through the wall of the casing 11. Suitable packing 22 retained by a gland 23 embraces the shaft 10 to seal off the annular drainage space 20 from the exterior of the casing.

Either or both of the two annular sealing members 16 and 17 may be designed in accord with the invention and either of the two members may rotate with the shaft 10, the other of the two members being stationary. In the present construction, it is contemplated that the sealing member 16 will be substantially stationary with respect to rotation but will be floatingly mounted with freedom for longitudinal movement toward the matching sealing member 17 and it is further contemplated that the sealing member 16 will be designed with a self-compensating configuration in accord with the principles heretofore explained.

The sealing member 17 that rotates with the shaft 10 is, in this instance, in the form of a ring of sintered tungsten carbide and is held on the rotating shaft by a suitable retaining sleeve 27. The retaining sleeve 27 has internal threads to engage threads 28 on the shaft 10 and cooperates with a bushing 29 to confine a suitable O-ring 30 to prevent flow of the high pressure fluid along the shaft. The annular sealing member 17 is backed against a packing ring 31 inside the retaining sleeve 27 and is embraced by an O-ring 32 to prevent leakage of the high pressure fluid past its outer circumferential surface.

The annular sealing member 16, which is of a configuration in accord with the present teaching, is made of stainless steel, for example, and has the general form of a sleeve or cylinder. The sealing member 16 has a seal face 35 (Figs. 5 and 6) which is spaced radially outward from the shaft 10, the face being adjacent the outer circumference of the sealing member rather than adjacent the inner circumference. Preferably, a suitable surface for the seal face 35 is provided by a thin layer or facing 34 of bearing bronze having a thickness on the order of 1/32 inch or 1/16 inch. A heavily leaded bronze is preferred in which the lead content is between 20% and 25%. A suitable composition, for example, is 20% lead, 10% tin and 70% copper.

The sealing member 16 has a circumferential shoulder 36 for abutment by a suitable helical spring 37 and slidingly embraces a cylindrical wall 39 of a fixed annular member 40. The annular member 40 is suitably anchored in the casing 11 by a dowel 41.

The inner circumference of the fixed annular member 40 provides enough clearance around the rotating shaft 10 to permit the previously mentioned leakage flow to the annular drainage space 20, but has its outer circumference sealed against longitudinal leakage by a pair of O-rings 42. To prevent leakage of the high pressure fluid between the sealing member 16 and the cylindrical wall 39, the sealing member is formed with an internal circumferential groove 47 to retain a suitable O-ring 48.

Since the seal face 35 of the annular sealing member 16 is adjacent the outer circumference of the sealing member rather than the inner circumference, an annular recess 50 is cut on the outer circumference of the sealing member, in accord with the present invention, to form an annular section 51 that provides the desired self-correcting yielding action on the part of the annular sealing member. The annular recess 50 conforms to a conical configuration, the recess being convergent away from the seal face 35 as viewed in longitudinal section in Fig. 1. It will be noted that the inner conical wall 52 of the annular recess 50 bounds one side portion of the annular section 51 and that the seal face 35 bounds another portion of the annular section. It can be seen that the radial dimension of the annular recess 50 approximates the radial dimension of the seal face 35, and that the annular recess is radially coextensive with at least the major portion of the seal face.

The manner in which the section 51 is subjected to fluid pressure and the general manner in which it will respond to the fluid pressure may be understood by referring to Figs. 3, 4 and 6. Fig. 3 shows the general character of the pressure gradient that is established radially across the seal face 35 by the controlled radially inward leakage flow of the confined fluid. It will be noted that the pressure across the seal face drops from the maximum pressure $p$ of 2700 p. s. i. to a leakage discharge pressure $p_0$. In this exceedingly high pressure range, there is significant yield of the metal in compression so that the two faces of the sealing members that form the seal gap tend to diverge as indicated by the dotted lines in Fig. 4. In effect, the seal face 35 is inclined away from vertical as the face is viewed in radial cross section and it is the resulting distortion of the seal gap that causes the seal to fail of its purpose.

The high pressure components against the outer high pressure side of the section 51 cause it to react in shear and in flexure. Cutting the annular recess 50 in the sealing member to form the section 51 introduces a pressure compound normal to the inner conical wall 52 of the recess and also removes metal that would otherwise contribute to the longitudinal yield of the section 51 in compression. These facts must be considered in arriving at the desired self-compensating configuration.

For the purpose of exploring a progressive series of configurations to find one in which the yielding effects are balanced with respect to distortion of the seal gap, a general configuration for the section 51 shown in Fig. 6 may be taken as the starting configuration of the series and this starting configuration may be varied progressively in any suitable manner throughout the series. For example, the spacing of the annular recess 50 from the seal face 35 may be varied progressively by small increments or the radial depth of the annular recess may be varied within certain limits. In this particular instance, chosen for illustration, the procedure for progressively varying the starting configuration consists in progressively varying the angle of the annular recess to vary the annular profile of the inner conical wall 52 progressively while maintaining the other dimensions constant, including the radial dimension of the recess. In other words, the slope of the inner conical wall 52 is varied without varying the radial depth of the recess.

It is apparent from a consideration of Fig. 4 that the distortion of the seal gap is caused by relative shortening of the outer and inner edges of the seal face in response to compression and that the yielding action is essentially shortening of the outer edge. The analytical procedure, therefore, is directed to calculation of the deflection of the outer edge of the seal face with respect first to deflection caused by bending of the section 51; second, deflection caused by yield of the section in shear; and, third, deflection caused by yield of the material to the pr sure gradient across the seal face as well as pressure on the boundaries of the section 51 that are exposed to the full pressure of the confined fluid.

For the purpose of calculation, the following symbols and units may be used, the symbols representing various dimensions indicated in Figs. 5 and 6:

$p$=pressure to be sealed—p. s. i.
$p_0$=discharge pressure of seal—p. s. i.
$L$=width of seal face—in. (radial dimension)
$q$=height of the outer edge of seal face—in.
$\theta$=under-cut angle—degrees $$K = q + \frac{L}{\tan \theta}$$

$r_2$=radius of outer edge of seal face—in.
$r'$=radius of inner edge of seal face—in.
$r_1$=radius of inner shoulder of seal follower—in.
$M$=bending moment due to applied load—in-lbs.
$m$=bending moment due to unit load applied at point of deflection—in-lbs.
$E$=modulus of elasticity of the material in tension—p. s. i.
$E_s$=modulus of elasticity of the material in shear—p. s. i.
$I$=moment of inertia of the resisting section—in.$^4$
$b$=width of annular section 51—in.
$V$=shear force due to applied loads—lbs.
$v$=shear force due to unit load applied at point of deflection—lbs.
$Q$=first moment of the area of the resisting section about the antroid of the section—en.$^3$
$\mu$=Poissons ratio
$\Delta_B$=deflection of outer edge of seal face due to bending—in.
$\Delta_S$=deflection of outer edge of seal face due to shear—in.
$\Delta_C$=relative shortening of outer edge of seal face due to thick wall cylinder action and pressure gradient across seal face—in.

The calculations are based on the following values:

$p$=2700 p. s. i.
$p_0$=300 p. s. i.
$L$=0.280 in.
$q$=0.25 in.
$r_1$=1.36 in.
$r_2$=1.83 in.
$r'$=1.55 in.
$E$=10,000,000 p. s. i.
$E_s$=4,000,000 p. s. i.
$\mu$=0.25

(The material selected for the annular sealing member is bearing bronze. A suitable bronze comprises 20% lead, 10% tin and 70% copper.)

At the outset, it is necessary to assume some specific pressure gradient across the seal face 35. For the purpose of the present calculation, $p_0$ is assumed to be 300 p. s. i.

The deflection of the outer edge of the seal face due to bending may be calculated by applying the principle of virtual work, a variation of Castigelano's theorem of elastic energy. This method gives the expression:

$$\Delta_B = \frac{\int_0^L M m \, ds}{EI}$$

The expression is integrated over the entire length of the bending member.

The major assumptions made in this investigation in addition to the usual elastic requirements were as follows:

1. The annular section 51 was considered as having constant width. The radial taper due to curvature was neglected.

2. The circumferential forces were neglected in determining the bending moment, a consequence of the first assumption.

3. The resisting section acts as a cantilever beam, a consequence of the first assumption.

Applying the above principle and the assumptions, the expression for deflection of the outer edge of the seal face was determined as follows:

Equation 1:

$$\frac{Eb}{12p}\Delta_B = \left(\frac{bL^4\left(1-\frac{p_0}{p}\right)}{8K^2L} + \frac{bL^3}{2K^2 \sin^2 \theta} - \frac{bL^3}{2K^2}\right) \tan \theta +$$
$$\left(\frac{-q^3 b}{4K^2} + \frac{3q^2 b}{2K} + qb \log_e K - \frac{qbL^3}{2LK^2}\left(1-\frac{p_0}{p}\right) - qb(1.25 + \log_e q)\right) \tan^2 \theta +$$
$$\left(\frac{-3qb}{2\sin^2 \theta} + \frac{3qb}{2}\right)\left(\log_e K + \frac{2q}{K} - \frac{q^2}{2K^2} - (1.5 + \log_e q)\right) \tan^4 \theta +$$
$$\left(\frac{3q^2 b\left(1-\frac{p_0}{p}\right)}{2L}\right)\left(\log_e K + \frac{2q}{K} - \frac{q^2}{2K^2} - (1.5 + \log_e q)\right) \tan^5 \theta$$

Using the same assumptions, the deflection of the outer edge of the seal face due to shear may be calculated by applying the principle of virtual work. This method gives the general shear deflection equation as follows:

$$\Delta_S = \int_0^L \frac{Vv \, ds}{I^2 E_s} \int_0^{\text{Area}} \frac{Q^2 dy}{b}$$

The first integral is taken over the entire length of the member, an the second integral is taken over the entire cross-sectional area of the resisting section. Applying this principle and the assumptions, the expression for the deflection of the outer edge of the seal face was determined as follows:

Equation 2:

$$\Delta_S = \frac{9(p-p_0) \tan^3 \theta}{15 E_s L}\left(\frac{K^2}{2} - 2qK + q^2 \log_e K + q^2(1.5 - \log_e q)\right)$$

The deflection of the outer edge of the seal face in response to the pressure gradient across the face and in response to the full pressure of the confined fluid on the outer circumference of the annular sealing member is due to three factors: first, the thick wall cylinder deflection due to outside pressure on a uniform cylinder; second, the relative deflection due to the pressure gradient across the seal face and the change in length of the section due to the undercut; and third, the relative deflection due to the variation in thick wall cylinder action due to the undercut. Applying the thick wall cylinder relations and noting the geometry of the section, the expression for the relative shortening of the outer edge is derived as follows:

Equation 3:

$$\Delta_C = \frac{-p}{E}\left[\left(\frac{p_0}{p}-1\right)q + \left(\frac{p_0}{p}-\frac{2\mu r_2^2}{r_2^2-r_1^2}\right)\frac{L}{\tan\theta}\right] - \frac{2p\mu}{E\tan\theta}\left[\left(r'-\frac{r_1}{2}\log_e\frac{-r_1^2+r_1r'}{-r_1^2-r_1r'}\right) - \left(r_2-\frac{r_1}{2}\log_e\frac{-r_1^2+r_1r_2}{-r_1^2-r_1r_2}\right)\right]$$

The above Equations 1, 2 and 3 are the analytical expressions for the separate parts of the total deflection of the outer edge of the seal face. The problem is to determine the undercut angle $\theta$ and the length $q$ such that deflection due to bending plus shear is equal to the relative shortening of the section 51 of the sealing member. That is to say, Equation 1+Equation 2=Equation 3. The final step is to solve this resulting equation for $\theta$ as a function of the geometry of the sealing member.

On examining Equations 1, 2 and 3, it is found that a direct analytical solution would be a tremendous task. Consequently, a numerical solution for a particular set of dimensions for the sealing member is carried through, the numerical solution being based on the various values heretofore set forth. The results of the numerical solution may be understood by the following tabulation:

| Angle θ, Degrees | Bending Deflection $\Delta_B$, inches | Shear Deflection $\Delta_S$, inches | Relative Shortening of inner and outer edge $\Delta_C$, inches |
|---|---|---|---|
| 15 | .0001028 | .00003428 | −.000476 |
| 20 | .0001422 | .00007375 | −.000364 |
| 30 | .0002374 | .00026279 | −.000253 |
| 40 | .0003496 | .00077746 | −.000193 |
| 45 | .0003937 | .00130430 | −.000172 |

It is apparent from this tabulation that the desired configuration in which the distortion effects of pressure are balanced will be found at some point in the proposed progressive series of configurations at which the angle $\theta$ of the annular recess 50 is at some point between 20° and 30°. Putting the results of the tabulation in the form of the graph in Fig. 7, it appears that the point of balance is found when $\theta = 24\frac{1}{2}°$. Empirical exploration through the proposed series of configurations resulted in an efficient seal in which the angle $\theta$ is 31°.

The discrepancy between the two results is attributable to the assumptions made during the solution, which assumptions are in the direction of reducing the rigidity of the part. The discrepancy is further attributable to the fact that the calculations do not take into consideration the effect on the seal gap of yield on the part of the tungsten carbide ring that provides the second seal face at the gap. Since tungsten carbide has a modulus of elasticity of 95,000,000 p. s. i., the yielding action is relatively small but, nevertheless, constitutes a factor in the situation. There is also the possibility of errors in the complex numerical solution. Allowing for all of these causes for discrepancy, however, the analytical calculations are highly useful and at least indicate whether or not a selected series of configurations actually brackets a point of balance with respect to the opposite distortion effects. The analytical calculations are further useful in affording certain generalizations about the factors involved in designing such a sealing member.

One generalization is that of the angle of undercut $\theta$ appears to be independent of the material of the annular sealing member. On examining Equations 1, 2 and 3, it is seen that the modulus of elasticity is a constant factor and thus for different materials the various deflections would be constant multiples depending upon the elastic properties, $E$ and $E_s$ of the material used to make the sealing member.

Another generalization is that, for practical purposes, the angle of the undercut appears to be independent of the operating pressure. On examining Equations 1, 2 and 3, it is seen that the internal pressure $p$ or the difference between the internal pressure and the external pressure, $p-p_0$, are constant multiples of the deflection equations. The ratio of the external pressure to the internal pressure $$\frac{p_0}{p}$$

enters into Equations 1 and 3. This pressure ratio is primarily a result of the pressure gradient across the seal face. In the low pressures where $p$ is approximately the same as $p_0$, the seal is not greatly influenced by the deflection. In the high pressure ranges the ratio of $$\frac{p_0}{p}$$

is small and will not greatly affect the deflections. Consequently it would appear that the undercut angle $\theta$ will be only mildly influenced by changes in pressures.

A generalization may be made also with respect to the effect of the radial dimension of the seal face. To determine the influence of the radial dimension of the seal face $L$ on the undercut angle $\theta$, the dimension $q$ was assumed to be zero. This gave the following general relations for the bending and shear conditions:

$$\Delta_B \sim (L)(\text{const.})$$
$$\Delta_S \sim (L)(\text{const.})$$

In the case of the relative shortening, the general expression is much more difficult to establish than the bending and shear conditions. To definitely establish this last condition several values of $L$, the radial dimension of the seal face, could be assumed and the general relation established. However, the relationship between the various radii and the radial dimension of the seal face are determined from the seal theory as:

$$r' = \frac{L}{0.183} \text{ and } r_2 = 6.47L$$

For any particular seal $r_1 = (L)(\text{const.})$. Using these conditions, the deflection equation can be reduced to the general expression:

$$\Delta_C \sim (L)(\text{const.})$$

From these three general deflection equations it would appear that the width of the seal face does not greatly influence the undercut angle $\theta$.

My disclosure will suggest to those skilled in the art various departures and alternative procedures in the application of the underlying concepts of the invention that properly lie within the spirit and scope of my appended claims.

I claim as my invention:

1. A device for providing a seal between a very high pressure region and a low pressure region, including an annular sealing member and a mating annular member respectively provided with radially extending annular sealing faces cooperating to form therebetween a radially extending annular sealing gap, one end of said gap communicating with said high pressure region and the other end thereof communicating with said low pressure region, the pressure in said gap progressively decreasing from said one end to said other end thereof, said sealing member including an annular body section and an annular section integrally joined to said body section at one end only of said annular section, said annular section having an end which forms said sealing face of said sealing member and which is thereby exposed to the pressures in said gap, said annular section having an annular surface thereon of a radial extent substantially equal to the radial length of said gap and axially aligned therewith, said annular section joining said body section closely adjacent one radial extremity of said annular surface, means mounting said sealing member and annular mating member for relative rotation about an axis, means urging said members axially together to maintain said sealing faces in sealing relation, said annular surface being so related to said gap that said annular section is distorted by the differential between the total pressure on said annular surface and the total pressure in said gap in a direction to restore substantial parallelism between said sealing faces after widening of said gap at said one end thereof due to compression of the material of said members by said high pressure.

2. A device as defined in claim 1 wherein said annular section is joined to said body section adjacent the radial extremity of said annular surface corresponding to said other end of said gap whereby said annular surface is exposed to said high pressure region.

3. A device as defined in claim 2 wherein said annular surface tapers in an axial direction away from said gap and wherein said one end of said gap is the radially outer end thereof.

4. A device as defined in claim 3 wherein the angle of taper of said annular surface relative to said axis is of the order of 31°.

References Cited in the file of this patent

UNITED STATES PATENTS

| | | |
|---|---|---|
| 963,593 | Legros | July 5, 1910 |
| 1,781,201 | Spreen | Nov. 11, 1930 |
| 1,936,771 | Schellens | Nov. 28, 1933 |
| 2,032,817 | Svenson | Mar. 3, 1936 |
| 2,233,599 | Gilbert | Mar. 4, 1941 |
| 2,366,629 | Kohler | Jan. 2, 1945 |
| 2,393,691 | Karassik | Jan. 29, 1946 |
| 2,470,419 | Voytech | May 17, 1949 |
| 2,489,212 | Zwack | Nov. 22, 1949 |
| 2,503,086 | Albright | Apr. 4, 1950 |
| 2,531,079 | Payne | Nov. 21, 1950 |
| 2,555,492 | Kidney | June 5, 1951 |
| 2,673,752 | Swearingen | Mar. 30, 1954 |

OTHER REFERENCES

"Mechanical Seals" (Brkich), published in Product Engineering, April 1950, 5 pages. (Copy in Scientific Library.)